United States Patent

[11] 3,548,974

| [72] | Inventor | Hermann Klaue<br>3 Avenue Des Planches, Montreux,<br>Switzerland |
|---|---|---|
| [21] | Appl. No. | 773,798 |
| [22] | Filed | Nov. 6, 1968 |
| [45] | Patented | Dec. 22, 1970 |

[54] LEVER ACTUATED DISC BRAKE
9 Claims, 12 Drawing Figs.

| [52] | U.S. Cl. | 188/73 |
|---|---|---|
| [51] | Int. Cl. | F16d 55/224 |
| [50] | Field of Search | 188/73, 73CL, 76 |

[56] References Cited
UNITED STATES PATENTS

| 2,987,142 | 6/1961 | Gracie, Jr. | 188/73X |
| 3,053,346 | 9/1962 | Butler | 188/73 |
| 3,260,332 | 7/1966 | Wells | 188/73 |
| 3,332,518 | 7/1967 | North et al. | 188/73X |

FOREIGN PATENTS

| 728,709 | 4/1955 | Great Britain | 188/73 |

*Primary Examiner*—George E. A. Halvosa
*Attorney*—Larson and Taylor

ABSTRACT: A disc brake wherein friction linings are urged against the disc by levers on each side of the disc the levers being pivotable about a common axis, the pivoting movement being caused by urging apart projections extending from the levers. Stationary brackets, nonrotatably mounted on the brake, are operatively connected to the levers for preventing rotation thereof during the braking operation.

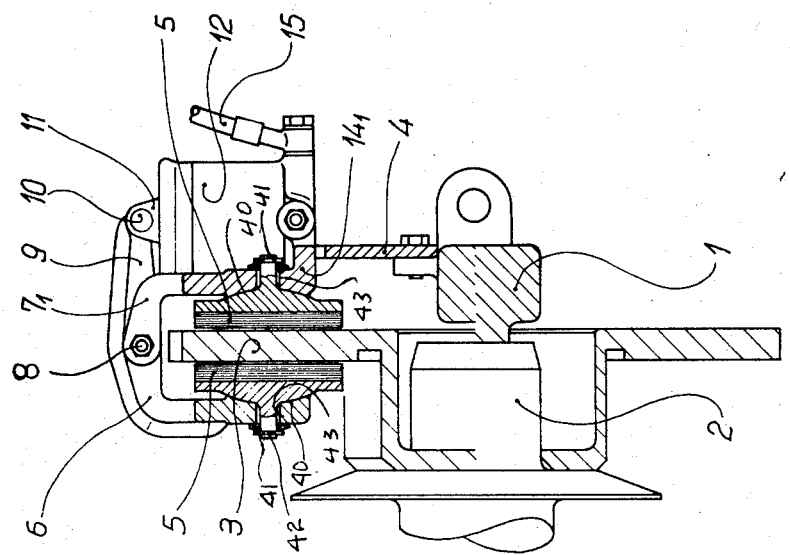
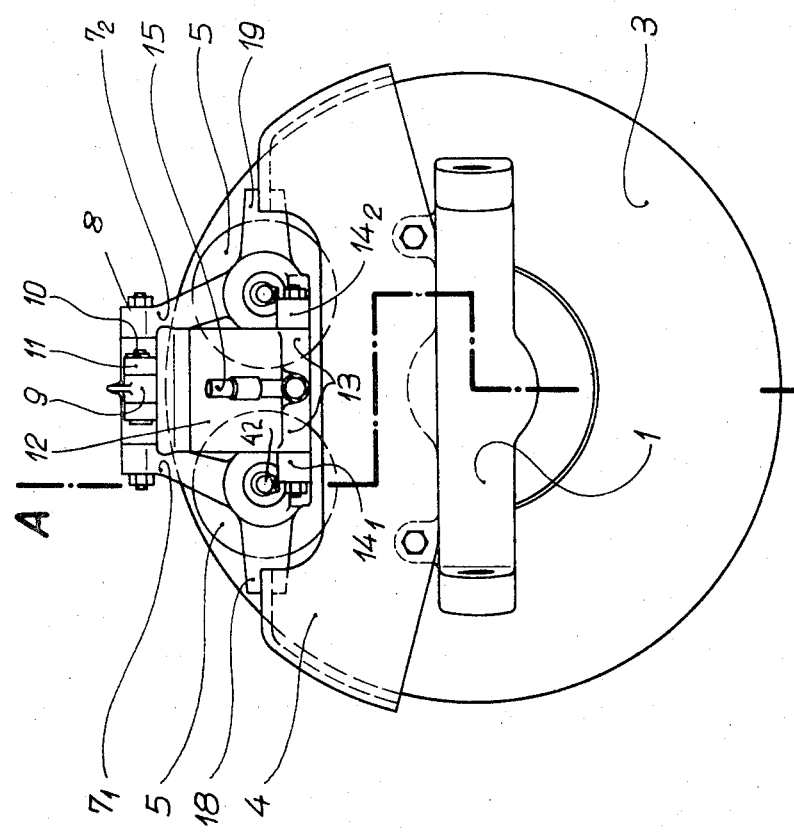

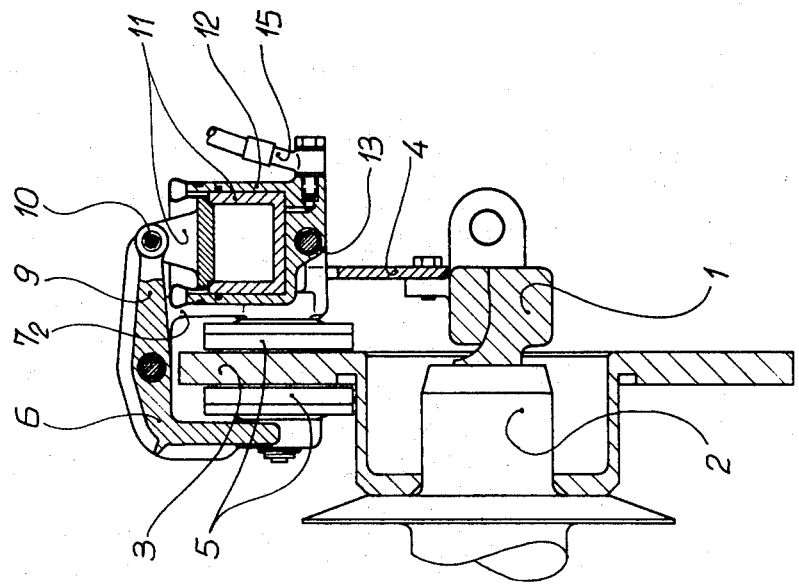
Fig.4 (C-D)
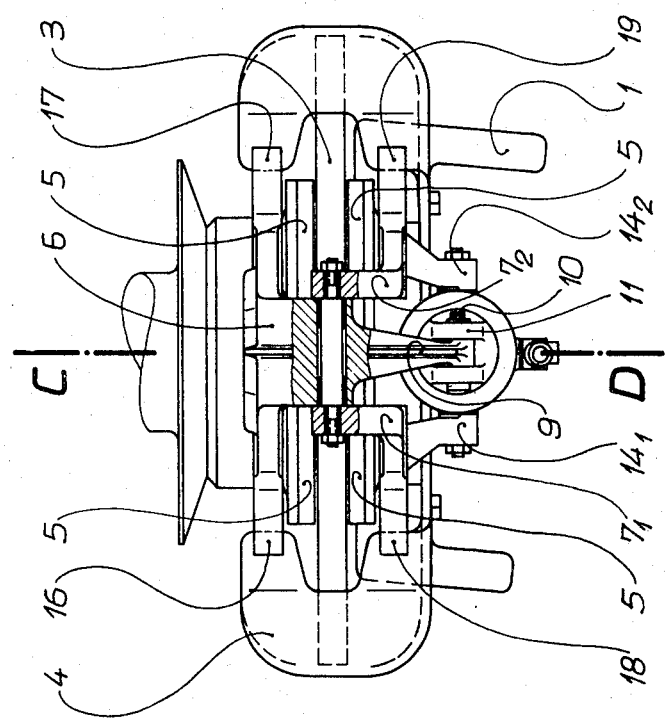
Fig.3

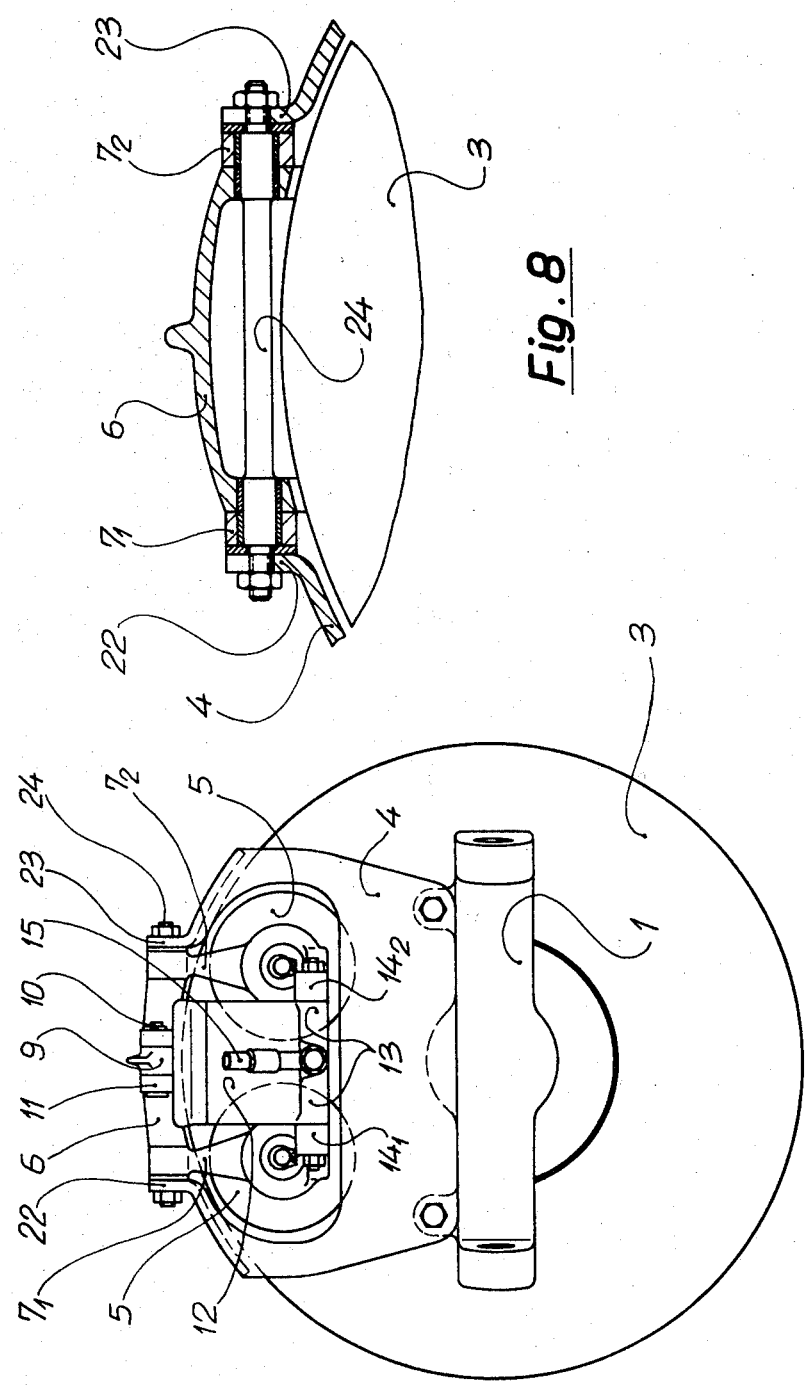

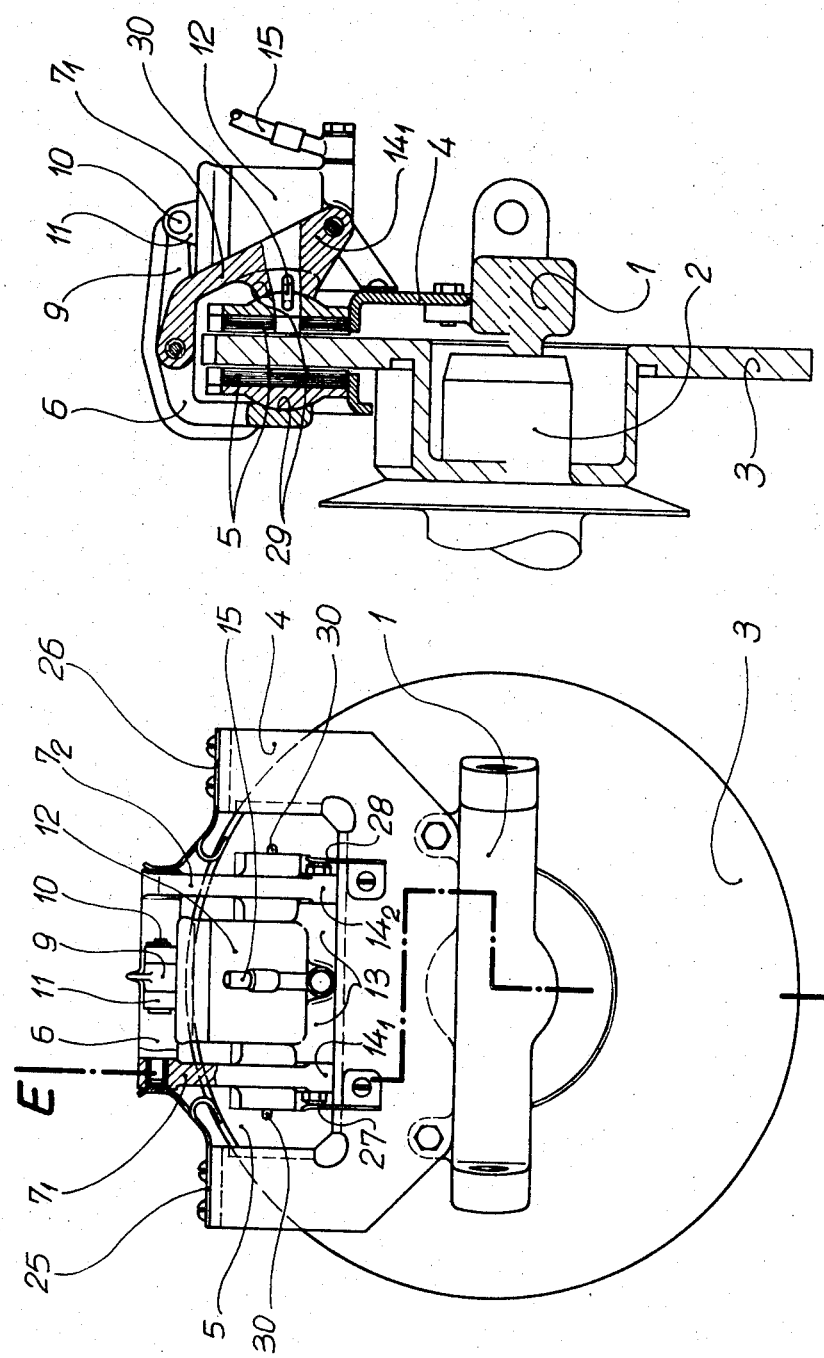

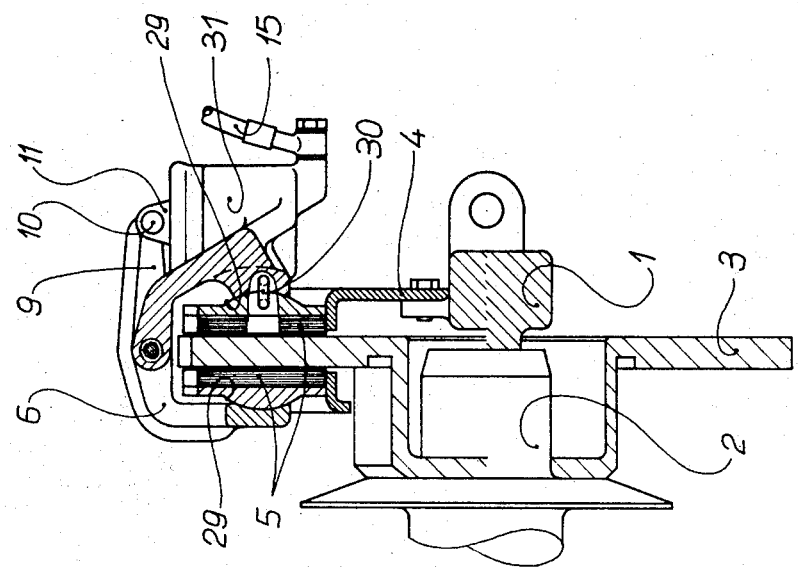
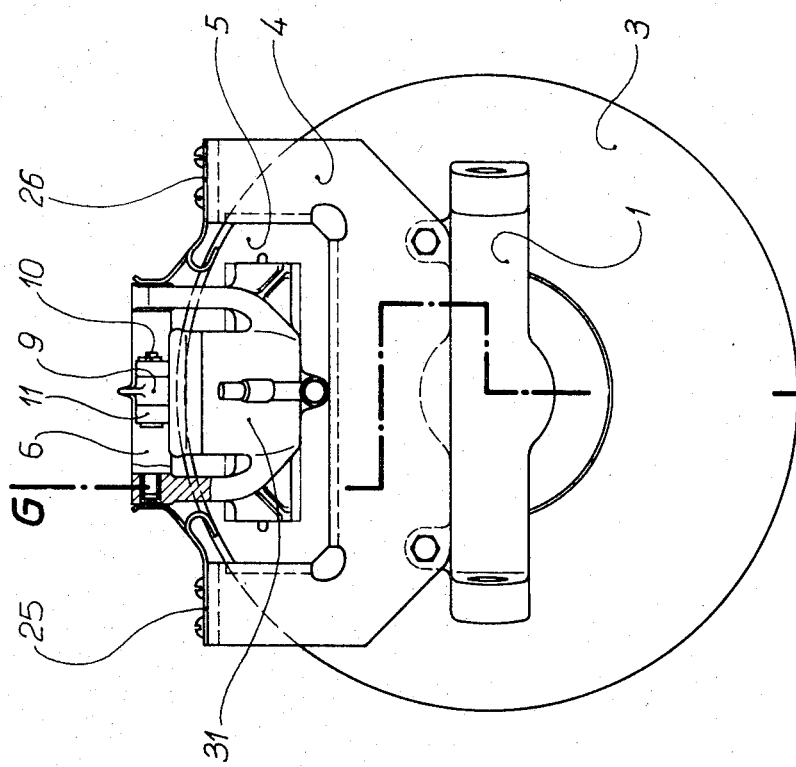
Fig. 11  Fig. 12 (G-H)

LEVER ACTUATED DISC BRAKE

This invention relates to brakes; and in particular it relates to a new and improved arrangement in disc brakes. In known disc brakes for motor vehicles and the like, the linings are normally mounted in a suitable brake yoke and arranged to undergo axial movement towards and away from the brake disc, under the influence of hydraulic cylinders located in the brake yoke directly behind the linings. However, this type of disc brake has the disadvantage that the considerable amount of heat generated by the brake is conducted through the linings to heat the elements which comprise the hydraulic cylinder, and in the case of high brake loads, this heat could destroy the collars associated with the hydraulic cylinders and could even boil the hydraulic liquid. Moreover, these conventional brakes tend to jam (this is particularly true of the brakes associated with the front wheels of the vehicle, whereat deformations of the axle occurs while driving around curves). This jamming is brought about by the fact that the brake yoke must be reinforced by suitable ribbing on both sides of the cut out which is provided for inserting and removing friction linings. In addition, the cut out requires a brake yoke which is rather large in the peripheral direction, as a result of which it is difficult to avoid the jamming effect resulting in deformation of the axle journal.

In addition, the structure of locating the hydraulic cylinder immediately behind the brake lining presents difficulties because of the quantity of heat generated. This arrangement requires the exclusive use of organic friction linings in order to delay the transfer of heat from the friction linings through the insulation and to the hydraulic elements. Thus, it is not practical with known arrangements to use the so-called inorganic linings such as metal or sinter linings which conduct heat at a greater rate but which are otherwise superior in that they have a considerably longer service life. Special friction linings having graphite carbon with a metal sinter binding, which is resistant to the effects of high temperature and which can maintain the braking surface practically free of cracks, even in the case of an extremely high load, may make disc brakes with a revolving smooth brake disc capable of being used despite their relatively high temperature level, as compared to disc brakes with revolving, ribbed brake housings, even in the case of very high loads.

Thus, there exists a need for a disc brake which is no larger or no heavier than existing disc brakes but which has improved thermal load characteristics.

SUMMARY OF THE INVENTION

Thus, it is a purpose of this invention to provide a new and improved disc brake wherein certain disadvantages of disc brakes known heretofore are eliminated, and which disc brakes have improved thermal load capacity.

Thus, according to the present invention there is provided a disc brake of the type for limiting rotation of a rotatable disc wherein the brake lining elements are arranged on both sides of the disc, and including levers which operatively engage the lining elements for urging the same against the disc. The levers on the two sides of the disc meet at a common pivot axis, and projections from the levers are acted upon by a suitable actuating means to pivot the levers about the said axis and thereby cause application of the brake linings against the disc. The levers are so shaped and the pivot axis is so located that when the projections are urged apart and the levers are urged against the lining elements, the effect is to cause substantially equal contact pressure on both sides of the brake disc. In a preferred arrangement of the invention the actuating means will act in a direction substantially parallel to the friction surface of the disc, and preferably this actuating means will be a hydraulic piston cylinder unit.

In addition, it is preferable that the lining elements are connected with the brake levers in such a manner that the center of the swinging movement of the lining elements, (as the levers pivot about their common pivot axis) will lie approximately in the middle plane of the brake disc. This is achieved by locating the common pivot axis in the plane of the brake disc and also by constructing the reverse side of the lining elements in the shape of a partial cylinder, the axis of which cylinder lies in the middle of the brake disc, and by constructing the mating surface of the lever with a corresponding cylindrical recess.

According to another feature of the invention, improved means are provided for preventing rotation of the braking elements (the brake levers, etc.) in response to the considerable brake torque applied to these elements during the braking operations. In particular, this improved means for preventing rotation of the braking elements prevents a jamming of the axially movable braking elements. More specifically, the brake is provided with a stationary, nonrotatably mounted bracket which surrounds the brake disc, leaving an opening through which the various brake elements can be inserted, the said bracket being connected to the braking elements through suitable means. Preferably, this bracket will be formed by bending sheet metal, and the braking elements are attached thereto through suitable connecting means or by constructing the brackets so as to receive the lining elements therein in a snug manner so that relative movement of the friction lining elements in any direction other than the axial direction is prevented. In this embodiment, suitable leaf springs could be provided for holding the friction lining elements in place.

In a preferred arrangement of the invention, one of the levers will comprise a pair of levers having a boss formed thereon, the said boss supporting the cylinder of a hydraulic piston and cylinder unit. The other lever would extend from a point on the side of the brake disc opposite from the piston and cylinder, through the said common pivot connection to a point whereat it can be engaged and acted upon by the said piston and cylinder unit.

Thus, it is a purpose of this invention to provide a new and improved disc brake.

It is another object of this invention to provide a new and improved disc brake wherein the effects of overheating are minimized but wherein the size and complexity of the disc brake is held to a minimum.

It is another object of this invention to provide a disc brake operated by a pair of pivotally movable articulated levers.

Other objects and the attendant advantages of the present invention will become apparent from a detailed description to follow together with the accompanying drawings.

BRIEF DESCRIPTION OF THE DRAWINGS

There follows a detailed description of preferred embodiments of the present invention to be taken together with the accompanying drawings. However, it is to be understood that the detailed description and the drawings are intended only to describe and illustrate preferred embodiments of the invention, and that the invention is capable of numerous modifications and variations apparent to those skilled in the art.

FIG. 1 is a side elevational view of a disc brake constructed in accordance with the features of the present invention.

FIG. 2 is a cross-sectional view taken along line AB of FIG. 1.

FIG. 3 is a top plan view of the embodiment shown in FIGS. 1 and 2.

FIG. 4 is a elevational cross-sectional view taken along line CD of FIG. 3.

FIG. 7 is a side elevational view of another embodiment of the invention.

FIG. 8 is an enlarged section of a portion of FIG. 7.

FIG. 9 is a side elevational view of another embodiment of the invention.

FIG. 10 is a sectional view taken along line EF of FIG. 9.

FIG. 11 is a side elevational view of still another embodiment of the invention.

FIG. 12 is a sectional view taken along line GH of FIG. 11.

DETAILED DESCRIPTION OF THE PREFERRED EMBODIMENTS

Figure 5:
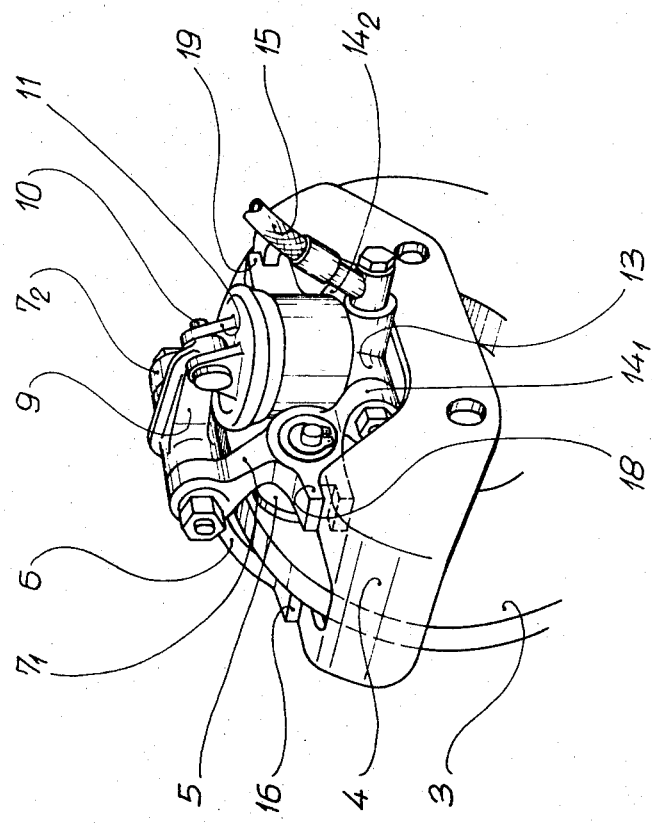
FIG. 5 is a perspective view of the embodiment of the invention shown in FIG. 1 through 4.

Referring now to the drawings, like numerals are employed to indicate like elements throughout all of the views.

Referring now to FIG. 1 there is shown a first embodiment of the invention wherein the numeral 1 designates the fixed part of the axis on which the rotatable hub 2 is mounted. 3 represents the brake disc which has been secured onto the rotating hub for rotation therewith. The element 4 represents a fixed brake bracket attached to the fixed part 1. Suitable friction lining elements 5 are mounted adjacent the surface of the disc 3 and are connected to brake levers 6, $7_1$ and $7_2$ such that the lining elements on each side of the disc 3 are movable towards and away from the disc brake 3 as the levers 6,$7_1$ and $7_2$ rotate about pivot connection 8. Extending from the lever 6 is a projection 9 which is connected through bolt 10 to piston 11, which piston cooperates with a cylinder 12. This cylinder is in turn mounted on a boss 13 which is formed on projections $14_1$ and $14_2$ extending from the lower end of the levers $7_1$ and $7_2$ respectively. A fluid line 15 is provided for introducing hydraulic fluid to the interior of cylinder 12.

To operate the brake, fluid would be introduced through line 15 to the interior of cylinder 12 thereby extending the piston and cylinder unit 11 and 12. Consequently, the levers 6, $7_1$ and $7_2$ would pivot about the pivot axis 8 and urge the lining elements 5 into engagement with the brake disc 3. Any errors in alignment between the levers and the brake disc are compensated by the fact that the mating surfaces of the levers and the lining elements are rounded, and that the lining elements are connected to the levers by suitable resilient means. See for example the mating spherical surfaces 40 shown in cross section in FIG. 2 and also the resilient means 41. It is further noted that the stem 42 of the lining elements 5 extend loosely through openings 43 in the levers, whereby the lining elements 5 are free to move slightly to compensate for any misalignment.

Figure 6:
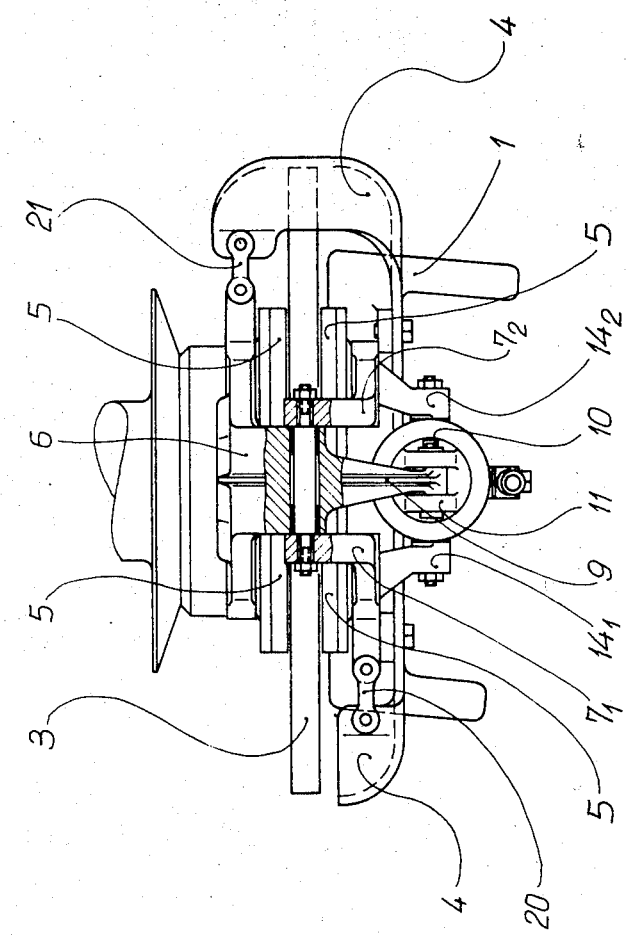
FIG. 6 is a plan view of an embodiment similar to that of FIGS. 1 through 5, but showing a modification thereof.

To prevent rotating movement of the brake elements including the levers the lining elements, etc., the levers have formed thereon lateral projections. Projections 18 and 19 are connected to levers $7_1$ and $7_2$, respectively, while projections 16 and 17 extend laterally from lever 6. These projections have forked ends which engage a portion of the bracket 4 between their prongs. Consequently, the torque imparted to the braking elements during the braking operation is transferred to and absorbed by the bracket 4. The embodiment of FIG. 6 is similar to the embodiment of FIGS. 1 through 5 except that the elements 16 through 19 are replaced by articulated control links 20 and 21 which are pivotally connected to both the levers and the bracket 4.

The embodiment of FIGS. 7 and 8 is similar to the embodiment of FIGS. 1 through 5 except that in place of the elements 16 through 19, the bracket 4 is provided with extension arms 22 and 23, formed integrally therewith, which arms are attached directly to the pin 24 which serves also the purpose of pin 8 in FIGS. 1 through 5 in that it serves as a mounting for the levers, 6, $7_1$ and $7_2$.

FIGS. 9 and 10 show one further embodiment of the invention and FIGS. 11 and 12 show a modification of that embodiment. In the arrangement of FIGS. 9 and 10 as well as in the arrangement of FIGS. 11 and 12, the bracket 4 is formed from a one piece sheet of metal which has been punched and bent such that it forms a recess on each side of the brake disc 3, into which recess the lining elements 5 are inserted. The lining elements are held snuggly in place by the sides of the recesses such that they are prevented from rotating about the axis of the disc 3 and from moving towards the axis of the disc 3 but are free to move in a direction parallel to the said axis of the disc 3 to be applied to and separated from the disc. Also, the lining elements 5 may be removed from the recesses in the radial outward direction for the purpose of replacing worn lining elements with new lining elements. Consequently, the snug fit is such that brake torque applied to the lining elements are in turn applied directly to the bracket 4. The lining elements are held in place by way of leaf springs 25 and 26. In addition, these springs have further resilient portions which engage the levers $7_1$ and $7_2$ thereby preventing the leaf springs from sliding down the pins of lever 6. In addition, leaf springs 27 and 28 are provided to firmly hold the braking elements in their position relative to the bracket 4. In this embodiment, the lining elements 5 are elongated and the rear surfaces thereof are cylindrical rather than spherical. The mating cylindrical parts of the lining elements and of the levers are shown at 29 in the FIGS. Round wire springs 30 are included to provide the necessary resilience between the lining elements 5 and the levers 6, $7_1$ and $7_2$.

In FIGS. 9 and 10 the cylinder 12 is attached to a boss 13 which is articulated to projections $14_1$ and $14_2$ in the same manner as in FIGS. 1 through 5. However, FIGS. 11 and 12 illustrate a modification wherein the cylinder and the levers corresponding to levers $7_1$ and $7_2$ are formed as one integral unit. In this case the braking cylinder must be equipped with a flexible piston to compensate for misalignment between the piston and the cylinder.

The embodiments of FIGS. 6 through 12 operate in the same manner as described above with respect to FIGS. 1 through 5.

Although the invention has been described in considerable detail with respect to preferred embodiments thereof, the invention is capable of numerous modifications and variations apparent to those skilled in the art without departing from the spirit and scope of the invention.

I claim:

1. A disc brake for limiting rotation of a rotatable disc relative to a stationary structure comprising, brake-lining elements arranged on both sides of said disc to frictionally engage said disc, first and second levers each having a main portion operatively engaging the lining elements on first and second sides of the brake disc, respectively, for urging the lining elements into frictional engagement with the disc, the main portions of the levers meeting along a common pivot axis, both said levers being mounted for pivotal movement about said pivot axis, the said first lever including a projection extending from said pivot axis away from the main portion of the first lever, the second lever including a projection extending outwardly from a point on the main portion of the second lever which is spaced from the said pivot axis, operating means mounted to urge the two projections apart to pivot the two levers about said axis to urge the lining elements into engagement with said disc, the said levers being so shaped, and the said pivot axis being so located, that when the projections are urged apart by the operating means, the levers cause the lining elements to exert substantially equal contact pressure on both sides of the brake disc, said brake further including a stationary nonrotatable bracket fixed with respect to said stationary structure, a holding leg extending laterally from each of said levers on each side of said disc in a direction generally parallel to the radial surfaces of said disc, said holding legs positively engaging said stationary bracket to substantially prevent rotation of said levers relative to the stationary bracket about the axis of rotation of this disc.

2. The invention according to claim 1 wherein the projections are arranged such that the said operating means acts upon said projections in a direction substantially perpendicular to the axis of rotation of the brake disc.

3. The invention according to claim 1 wherein each of said legs includes a forked end and wherein a portion of the bracket extends between the prongs of the said forked end such that relative rotation between the bracket and the lever is substantially prevented.

4. The invention according to claim 1 wherein each of said holding legs comprises control links articulated to both the levers and the bracket for substantially preventing relative rotation therebetween.

5. The invention according to claim 1 wherein the lining elements are movable, relative to their respective levers, in a direction generally parallel to the axis of rotation of the disc.

6. The invention according to claim 1 wherein the operating means is a piston and cylinder unit arranged to act upon said projections in a direction substantially perpendicular to the axis of rotation of the brake disc.

7. The invention according to claim 6 wherein the said cylinder and the second lever and the projection of the second lever are formed as one-piece.

8. The invention according to claim 6 wherein the center of rotation of the lining elements lies in the center plane of the brake disc and is substantially perpendicular to the axis of rotation of the disc.

9. The invention according to claim 6 wherein the main portion of the first lever is a single forked member, and wherein the second lever comprises a pair of parallel levers, a boss connected to the projections of the second levers and said cylinder being pivotally connected to said boss.